April 8, 1952   P. M. WILLENBRING   2,592,094
CHUCK KEY HOLDER FOR DRILL MOTORS
Filed May 17, 1950

INVENTOR
Paul M. Willenbring
BY Wilfred E. Lawson
ATTORNEY

Patented Apr. 8, 1952

2,592,094

UNITED STATES PATENT OFFICE 2,592,094

CHUCK KEY HOLDER FOR DRILL MOTORS

Paul M. Willenbring, St. Cloud, Minn.

Application May 17, 1950, Serial No. 162,566

4 Claims. (Cl. 248—1)

1

This invention relates to devices for holding chuck keys such as are used for operating a "Jacobs" chuck for the purpose of opening or closing the jaws thereof and it is an object of the invention to provide a key holding means which will permit the using of the key without removing it from its holder.

Chuck keys of the character with which the present invention is concerned are designed to be rotatably coupled with the chuck so that the bevel gear pinion, when meshed with the gear teeth of the chuck, can be freely turned or rotated. Some drill motors have holders for the keys when they are not in use, but for use the key must be removed from the holder and there is then the possibility that it may be lost. In other cases, mechanics tie the key to some part of the machine and one means is known for attaching the key by the cross bar, to the motor cord, but such attaching means prevents the free and unhampered rotation of the key where it is coupled to the chuck.

Another and more specific object is, therefore, to provide a novel chuck key holder which may be permanently secured to the electric cord of the drill motor, and hold the key in such a way that it can be coupled to the chuck in the normal manner and freely rotated to drive the chuck jaws shut or open all the way without removing the key from the chuck teeth.

A further object is to provide a chuck key holder in which the shank of the key is permanently rotatably mounted, with means for clamping the holder to the drill motor electric cord whereby the key and holder cannot become detached from the cord and at the same time the key can be completely and freely turned or rotated for use without subjecting the electric cord to twisting or other strains.

The invention will be best understood from the following detailed description taken with the accompanying drawing forming a part of the specification, with the understanding that changes and modifications may be made therein so long as such changes and modifications come within the scope of the appended claims.

2

Figure 3:
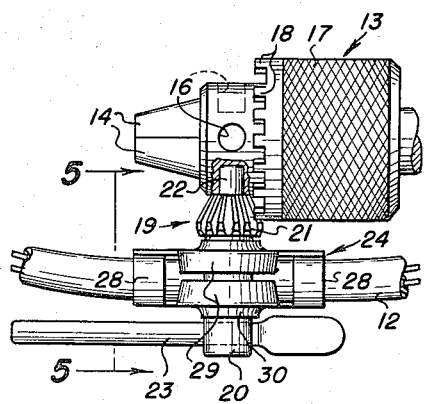
Figure 3 is a view in plan on an enlarged scale of the chuck showing the key and key holder applied.
Figure 6:
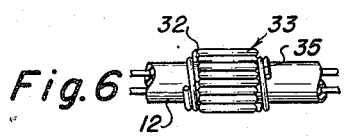
Figure 7:
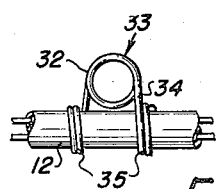
Figures 4, 5:
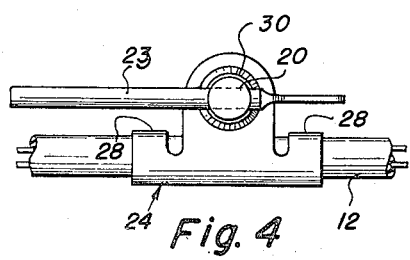

Figure 4 is a view in side elevation of the structure shown in Figure 3;

Figure 5 is a transverse section taken on the line 5—5 of Figure 3;

Figure 6 is a view in top plan of a second embodiment of the invention as applied to an electric cable;

Figure 7 is a view in side elevation of the structure shown in Figure 6.

Referring more particularly to the drawing, the numeral 10 generally designates a conventional electric drill, to the motor 11 of which is run the usual heavy rubber covered electric cable 12.

At the forward end of the motor is the chuck unit 13 having jaws 14 positioned in a sleeve 15 which is provided with a number of radially directed bores or sockets 16. The jaws are driven into shut or open position with respect to the shank of a drill or other tool (not shown) by means of a knurled sleeve 17, which is provided, on the end adjacent to the sleeve 15, with gear teeth 18.

The knurled sleeve 17 is turned by hand for roughly adjusting and closing the jaws 14 on a tool shank but in order to secure such shank firmly in the chuck use is made of a key 19. This key comprises a shank or shaft portion 20 having secured on one end a bevel gear pinion 21 and a trunnion 22 while a transverse handle bar 23 is extended through the other end. In use the trunnion 22 is engaged in a socket 16 and this brings the teeth of the gear 21 into mesh with the gear teeth of the sleeve 17 and the jaws may then be turned more tightly into gripping relation by this implement, as will be readily apparent.

The key, as will thus be seen, is a necessity in the proper operation of the chuck and it is important that it not be lost and also that it be always under the hand of the user of the drill, ready for use.

In accordance with one embodiment of the present invention there is provided a metal holder for the key, which is generally designated 24, and which is permanently secured to the electric cable 12 as shown.

Figure 1:
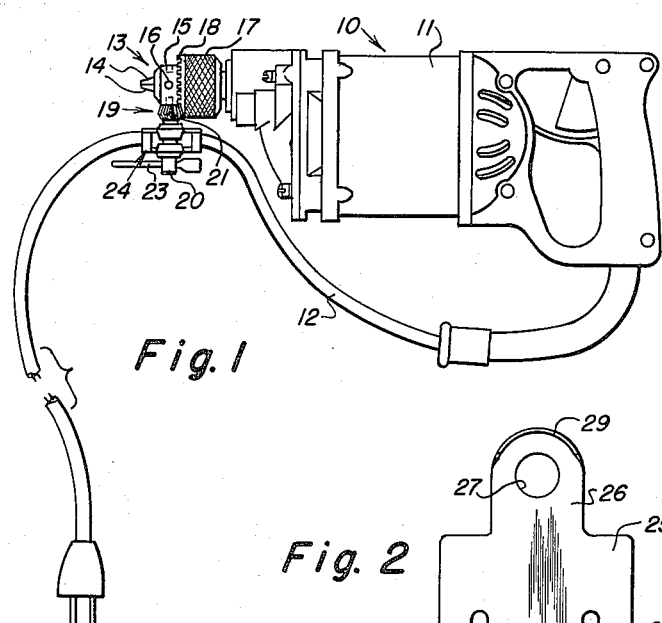
Figure 1 is a view in elevation of an electric drill showing the device in one of its embodiments applied.
Figure 2:
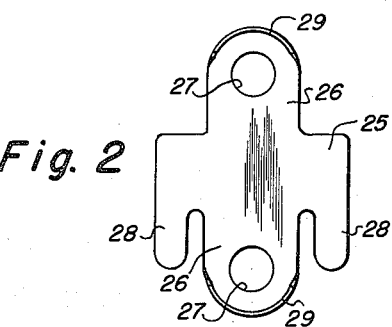
Figure 2 is a view of the blank from which the first embodiment of the invention is formed.

The holder 24, is formed from a single blank of sheet metal which, as shown in Figure 2 comprises initially a flat body part 25 from each of two opposite edges of which extend the ears 26, each of which has therethrough a bearing opening 27 through which the key shank 20 extends as hereinafter set forth.

Also at one of the said edges of the body part are the two tongues 28, one on each side of the adjacent ear.

The free end of each ear is substantially arcuate and defined by the turned flange 29, while the metal around each opening 27 is pressed outward slightly to form a hub or bearing flange 30.

In the shaping of the holder the body part 25 is bent on a line passing lengthwise between the edges from which the ears 26 extend, to a substantially U form, thus bringing the ears into spaced substantially parallel relation, to aline the openings 27 and place the flanges 29 in edge opposed relation. The hub flanges will be upon the remote sides of the ears, or directed oppositely outwardly.

The body part thus assumes a channel form in which the electric cord lies, and the cord is secured therein by bending the tongues 28 over the cord thus forming a ring or eye 31 encircling the cord, with a bearing means at one side of the cord and directed transversely thereof to receive the key shank 20 and support it for rotation.

The key handle bar 23 may be removed from the key 20 for the extension of the shank through the bearing openings and then replaced and secured. At one end of the shank the bevel gear 21 bears against the adjacent hub flange 30 while at the other end the handle bar 23 bears against the adjacent flange 30.

Figure 6 shows another embodiment of the invention formed from a length of wire of suitable character.

In this second embodiment the wire, designated 32, is twisted into a coil to form a cylinder 33, which provides a bearing through which the key shank 20 extends, and in which it turns or rotates.

Each end of the coil is extended tangentially to form a leg 34. The coil 33 is positioned upon the cable 12 to extend across the same, as shown, and the leg 34, which extends across the side of the cable, is then wrapped about the cable in one or two coils 35.

The leg ends 34 are taken off from opposite sides of the coil 33 and when they are wrapped or twisted about the cable, the coil 33, forming a bearing means for the key shank, will be rigidly held in position.

From the foregoing, it will be readily apparent that the present invention, in the embodiments shown and described, provides a means for securing a chuck key permanently in one place so that it cannot become lost and at the same time supports the key in such a manner that it may be applied to the chuck and freely rotated as necessary without having to twist the cable to which it is attached.

I claim:

1. Holding means for a chuck key having a shank, said means comprising a bearing through which said shank is adapted to extend, and means carried by the bearing and formed to receive and be secured to an electric cable to support the bearing thereon said last named means comprising a pair of spaced elongate members between which the bearing is positioned, said elongate members being of a character to be bent around and to retain their bent form on the cable.

2. Holding means for a chuck key adapted to be secured to an electric cable, said means comprising a pair of cable encircling gripping members, and means providing a bearing for rotatably receiving the key shank and supporting the same for rotation on an axis disposed across the supporting cable, said gripping members being formed on one side of a relatively long body of substantially U-shaped cross section in which the cable is received and the said bearing means comprising two spaced ears carried by said body in spaced relation, said ears having alined openings through which the key shank may extend.

3. A device for securing a chuck key to an electric cable comprising a long body of substantially U-shaped cross section to receive the cable, bendable fingers, carried by the body at one side thereof, a pair of spaced ears carried by the body between said fingers, said ears having bearing openings in which the key shank is rotatably received.

4. A device for securing a chuck key having a shank, to an electric cable, comprising a cylindrical body through which said shank extends, said body comprising a spirally wound wire having two ends, each of said ends being extended to form a leg, each of said legs being coiled about the cable to support said body transversely of the cable.

PAUL M. WILLENBRING.

REFERENCES CITED

The following references are of record in the file of this patent:

UNITED STATES PATENTS

| Number | Name | Date |
|---|---|---|
| 1,047,306 | Schaak | Dec. 17, 1912 |
| 2,120,828 | Barcy | June 14, 1938 |
| 2,257,559 | Albertson | Sept. 30, 1941 |
| 2,263,277 | Schumann | Nov. 18, 1941 |